2 Sheets—Sheet 1.
C. STUCKE.
Grain-Separator.
No. 201,206. Patented March 12, 1878.
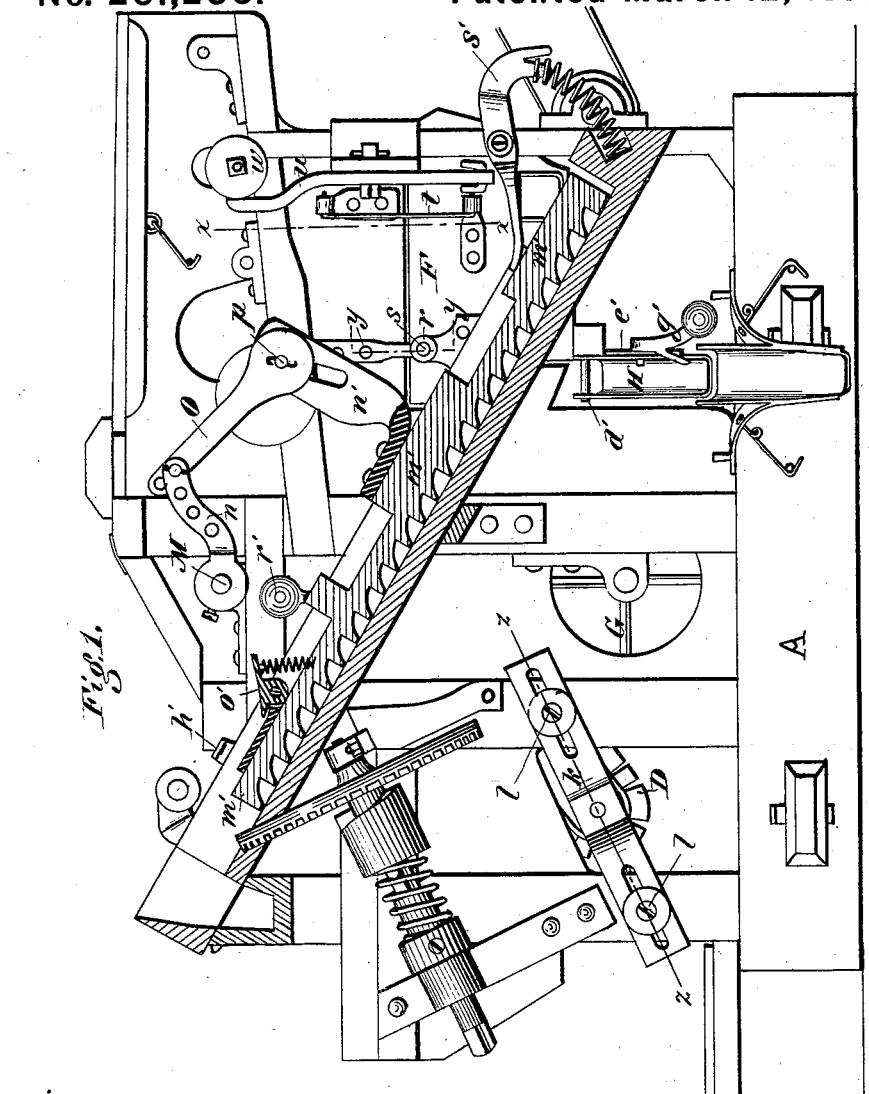
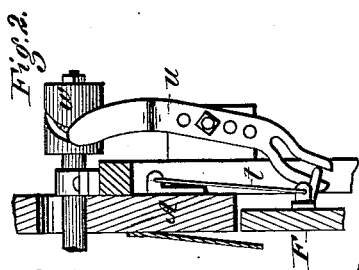
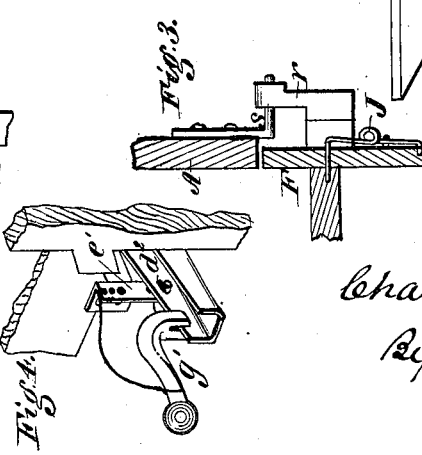
Witnesses:
Donn P. Twitchell
Will W. Dodge
Inventor:
Charles Stucke
By his attys.
Dodgerson

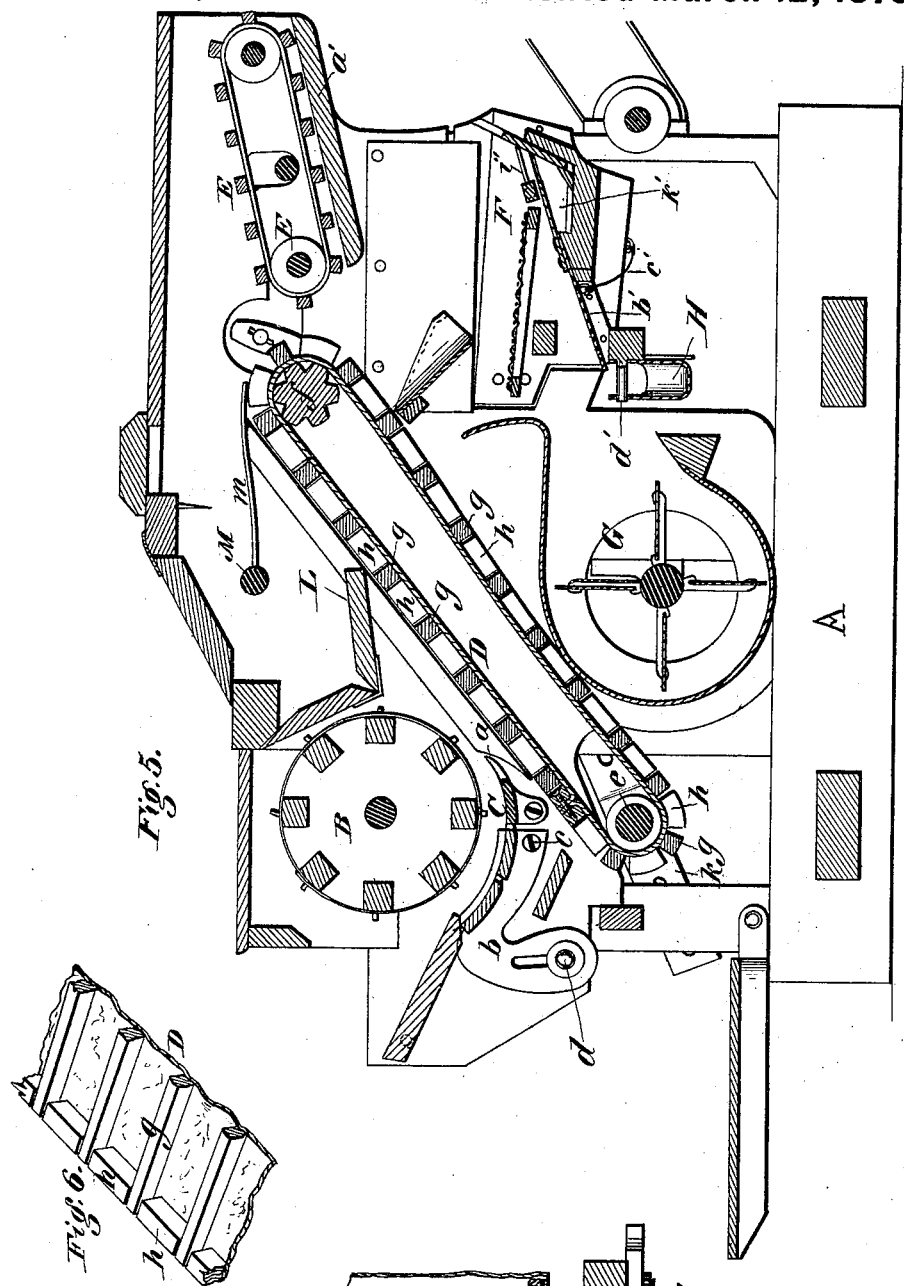

UNITED STATES PATENT OFFICE.

CHARLES STUCKE, OF HENDERSON, MINNESOTA.

IMPROVEMENT IN GRAIN-SEPARATORS.

Specification forming part of Letters Patent No. 201,206, dated March 12, 1878; application filed May 16, 1877.

*To all whom it may concern:*

Be it known that I, CHARLES STUCKE, of Henderson, in the county of Sibley and State of Minnesota, have invented certain Improvements in Thrashing-Machines, of which the following is a specification:

My invention consists in various details of construction hereinafter fully described and explained, but more especially in a novel construction of the elevator for returning the grain to the head of the machine; in the construction and arrangement of devices for fastening the reversible grain-delivering spout; and in the manner of sustaining and actuating the shoe in which the screens are carried.

Figure 1 represents a side elevation of my machine, with the grain-elevator shown in section; Fig. 2, a detail vertical section of a portion of the same, showing the manner in which the shoe is actuated; Fig. 3, a vertical section, showing the manner in which the shoe is sustained; Fig. 4, a perspective view, showing the device for locking the delivery-spout; Fig. 5, a longitudinal vertical section of the machine; Fig. 6, a perspective view, illustrating the construction of the straw-carrier; Fig. 7, a section, showing the manner in which the straw-carrier is sustained.

A represents the frame of the machine; B, the thrashing-cylinder; C, the concave; D, the straw and grain carrier; E, the straw-discharging apron; F, the shoe in which the screens are mounted; G, the fan, and H the delivery-spout, by which the cleaned grain is discharged from the machine.

The cylinder is constructed and armed with spikes, as usual, and the concave will also be provided, as usual, with corresponding spikes. The rear edge of the concave consists of a stationary transverse metal bar, having on its rear edge fingers or teeth $a$, which sustain the straw, but permit the kernels of wheat to fall through, thus assisting in the separation of the loose grain from the straw, and causing the grain to fall upon the carrier in advance of and below the straw, so that when the latter reaches the end of the elevator it will pass off without carrying the grain with it.

The forward portion of the concave consists of slats slipped into grooved end plates $b$, which have their rear ends pivoted at $c$, and their forward ends slotted and secured by bolts $d$, so that they may be adjusted to change the distance between the cylinder and the concave.

The straw and grain carrier D consists of an endless canvas apron mounted on two rolls, $e$ and $f$, and provided with transverse slats $g$ and longitudinal strips $h$, extending along the edges from slat to slat, as in Figs. 1 and 2. The edge strips $h$ serve to retain the loose grain on the apron, and prevent it from falling over the edge, the two sets of strips forming a series of large cells or pockets on the face of the apron, in which the grain is retained until it reaches the upper end, from which it falls upon the screens below, while the straw passes over upon the discharging-apron E.

In order to give the carrying-apron D a shaking motion to assist in separating the grain from the straw, the upper carrying-roll $f$ is constructed, as shown in Fig. 1, with longitudinal ribs.

In order that the carrier-apron D may be kept taut and prevented from sagging, its lower carrying-roll $e$ is mounted in adjustable bars $k$, which are slotted at their ends, and secured by bolts $l$ to the outside of the frame, but bent inward at the middle through the frame to receive the journals on the roll, as clearly shown in Fig. 3. By thus constructing and arranging the bars their fastening-bolts are at all times exposed on the outside of the machine, so that the bars may be readily adjusted, and at the same time the rolls are sustained by the bars close to the edges of the apron.

In order to hold the straw down upon the carrier and insure its advance thereby, a board or gate, L, is hinged at its upper edge in rear of the thrashing-cylinder. In order to assist and insure the separation of the loose grain from the straw as the latter is leaving the carrier, a transverse rock-shaft, M, is mounted on the top of the machine, and provided with arms $m$, as shown in Fig. 5, and on the outside of the machine the shaft is provided with an arm, $n$, connected by a pitman, O, with a crank-pin, $p$, as shown in Fig. 1, by which arrangement the arms $m$ are caused to whip or beat the straw with quick, sharp strokes.

The shoe or shaker F, in which the screens are mounted, is made in any ordinary form, and provided on each side with a sustaining-eye, $r$, arranged to slide on a transverse pin, $s$, which latter is formed on a metal plate secured to the frame, as shown in Figs. 1 and 4. The eye and pin, while mainly sustaining the weight of the shoe, admit of its being vibrated transversely of the machine, and also admit of its being rocked or tilted up and down at its front and rear edges. This rocking motion of the shoe and screens is secured by providing each side of the machine with a vertical rod, $t$, pivoted at one end to the frame and at the other to the shoe, as shown in Figs. 1 and 2. The transverse movement of the shoe causes the lower ends of the rods $t$ to describe an arc, in which they rise and fall sufficiently to cause the rocking of the shoe upon the pins $s$. This combined rocking and reciprocating motion of the shoe and screens causes the grain to move about upon the latter, and to be thrown upward therefrom in such manner that a very thorough separation of the impurities is secured.

The transverse vibration or reciprocation of the shoe is produced, as shown in Figs. 1 and 2, by means of an upright lever, $u$, pivoted at its middle to a plate on the side of the frame, with its lower end slotted and arranged to embrace an ear on the shoe, and its upper end provided with a stud working in a cam-groove in a pulley, $w$, which latter is mounted on a a transverse shaft. The lever $u$ and the plate to which it is pivoted are provided, as shown in Fig. 2, with a series of holes, one above another, to admit of the pivot pin or bolt being moved to vary the throw of the shoe.

The straw-delivering apron or carrier E consists simply of narrow belts provided with transverse slats, between which the short straw and heads of grain having grain therein may fall to the inclined board $a'$ below, by which they are delivered to the screens in the shoe.

The upper screen is seated on bearings in the shoe and secured at one end by a spring-catch, J, such as shown in Fig. 4, the spring being attached to the outside of the shoe and provided with a point or nose passing through the same into the screen. By merely drawing back the ends of the spring with the fingers the screen may be released, so that it may be readily removed from the shoe with the other hand.

The lower screen, $b'$, is seated on bearings in the shoe, and secured by hooks $c'$ on the under side, the hooks being attached to the shoe in such position that they may be conveniently reached with the hand.

The trough or spout H, into which the cleaned grain is delivered by the screens, is arranged transversely in the machine, and pivoted at the middle on a fixed stud, $d'$, as shown in Figs. 1 and 5, so that it may be tilted to the right or the left, and thereby caused to deliver the grain on one side of the machine or the other, as desired. In order to lock the spout in either position desired, it is provided, as in Fig. 4, with a hole, $d^2$, and a plate, $e'$, arranged on the machine at its side, and provided with a series of holes through which to pass a fastening-pin into the hole in the spout.

The fastening device $g'$ consists of a pin to enter the holes formed on one end of a bar, which has a lip to lock over the edge of the spout and prevent the escape of the pin, and a weighted end to hold the lip down in place. By lifting the weighted end of the arm the lip is disengaged from the trough and the removal of the pin permitted.

The coarse heavy material which may pass down over the upper screen in the shoe—such, for example, as the heads having wheat therein—pass through a coarse grating, $i'$, and are caught in a transverse trough, $k$, which is secured in the shoe, and provided with ratchet-teeth across its bottom to feed the material to the side of the machine, where it is delivered to an elevator, (shown in Fig. 1,) which extends upward, and discharges in front of the thrashing-cylinder.

The elevator consists, as shown in Fig. 1, of an inclined trough, and of a bar, $m'$, having teeth on its under face, mounted in the trough, and actuated in such a manner that it falls down upon the grain in the trough, and slides rapidly upward, and then rises from the grain and moves down endwise, and, falling upon the grain, slides upward again, and so on repeatedly, the motion being a rapid one, so that the teeth catch the grain and throw it upward with a succession of short, quick strokes, following each other so rapidly that the grain has no time to descend between them. This arrangement, in addition to being simple and effective as an elevator, has the advantage of serving to separate the grain from the husks, and of liberating all foreign matters, so that they may be readily liberated during the passage of the grain through the machine.

The toothed bar may be driven by any suitable arrangement of devices; but that shown in the drawings is considered the best.

As shown in Fig. 1, the bar $m'$ is provided with an upright slotted bar, $n'$, driven by the crank $p$, which serves to move the bar endwise, and also to lift it from the bottom of the trough during its downward movement. The lifting of the bar in the trough is also assisted by the use of an inclined pivoted dog, $o'$, mounted on the bar, and arranged to ride alternately over and under overhanging arms $p'$ secured to the sides of the trough, as shown. The dog $o'$ is urged upward by a spring under it, so that as the toothed bar is moved toward the tail of the machine the dog rides over the arms $p'$ and lifts the bar from the grain in the trough; but as the bar is carried toward the head of the machine the dog rides under the arms and presses the bar upon the grain.

Having described my machine, what I claim is—

1. In a grain-separator, the combination of an elevator-apron, D, and a series of horizontal arms, m, attached to a rock-shaft, and arranged to act flatwise upon the grain with a quick whipping action, as described.

2. In a thrashing-machine having a thrashing-cylinder in one end and screens in the other, an outside inclined trough or spout, and the toothed bar m', filling the same from side to side, and arranged to rise and fall and move endwise therein, as shown.

3. In a thrashing-machine, a returning spout or trough for the tailings, the toothed bar m' mounted therein, slotted arm n', crank p, arms p', and pivoted dogs o', urged upward by springs, said parts being arranged to operate in connection with and driven by the thrasher.

4. In combination with the pivoted reversible delivery-spout and the bar e', having the holes therein, the locking device g', provided with the retaining-lip and the weighted end.

5. The shoe or shaker F, sustained by the eyes r, and studs or pins s and the rods t, and arranged to vibrate transversely, as described.

CHARLES STUCKE.

Witnesses:
CHARLES F. LANCASTER,
WILLIAM C. WHITE.